UNITED STATES PATENT OFFICE.

CHRISTIAN RAMPINI, DECEASED, BY WILLIAM E. WARLAND, ADMINISTRATOR, OF BROOKLYN, NEW YORK, ASSIGNOR TO BADISCHE ANILIN & SODA FABRIK, OF LUDWIGSHAFEN-ON-THE-RHINE, GERMANY.

PRODUCING AMINO-ANTHRAQUINONES AND DERIVATIVES THEREOF.

1,063,172. Specification of Letters Patent. Patented May 27, 1913.

No Drawing. Application filed March 15, 1912. Serial No. 684,081.

*To all whom it may concern:*

Be it known that I, WILLIAM E. WARLAND, a citizen of the United States, residing at Brooklyn, in the county of Kings and State of New York, administrator of the estate of CHRISTIAN RAMPINI, deceased, late a subject of the King of Bavaria, believe that CHRISTIAN RAMPINI did invent new and useful Improvements in Producing Amino-Anthraquinones and Derivatives Thereof, of which the following is a specification.

It has been discovered that substituted alpha-amino-anthraquinones, substituted in the amino group, can be obtained smoothly and in good yield by heating an alpha-anthraquinone-sulfonic acid with an organic amin in the presence of water and of an oxidizing agent which does not attack the amino compound under the conditions existing during the process. As instances of suitable oxidizing agents may be mentioned manganese peroxid, cuprous oxid, cupric oxid, a bichromate, arsenic oxid and silver oxid.

According to the process of the present invention, substituted alpha-amino-anthraquinones can be obtained in much better yield and in purer form than is the case when no oxidizing agent is employed during the reaction.

The following examples will serve to illustrate further the nature of this invention, which, however, is not confined to these examples. The parts are by weight.

Example 1: Heat together, for from 5 to 6 hours, at 150° C., in an autoclave provided with a stirrer, 100 parts of the potassium salt of anthraquinone-alpha-sulfonic acid, 600 parts of a 6 per cent. monomethylamin solution, and 13 parts of potassium bromate. The alpha-methylamino-anthraquinone is obtained in a crystalline form and is very pure. It is filtered off and washed with water. In this example the potassium bromate can be replaced by the corresponding quantity of manganese dioxid.

Example 2: Heat together for from 10 to 15 hours, in an autoclave at about 200° C., 75 parts of anilin, 75 parts of water, 20 parts of the potassium salt of anthraquinone-1-sulfonic acid and three parts of potassium bromate. When the reaction mixture is cold, add 500 to 1,000 parts of water, acidify with hydrochloric acid, filter off the 1-anilido-anthraquinone, wash it with water and dry it. It is identical with the compound obtained by boiling 1-nitro-anthraquinone with anilin.

Now what is claimed is:—

1. The process of producing alpha-amino-anthraquinones substituted in the amino group, by heating alpha-anthraquinone-sulfonic acids with organic amins in the presence of water and of an oxidizing agent.

2. The process of producing alpha-methylamino-anthraquinone by heating anthraquinone-alpha-sulfonic acid with monomethylamin in the presence of water and in the presence of an oxidizing agent.

3. The process of producing alpha-methylamino-anthraquinone by heating anthraquinone-alpha-sulfonic acid with monomethylamin in the presence of water and in the presence of potassium bromate.

In testimony whereof I have hereunto set my hand in the presence of two subscribing witnesses.

WILLIAM E. WARLAND,
*As administrator of Christian Rampini, deceased.*

Witnesses:
CHRIS. H. AHNSTAEDT,
WILLIAM MILLER.